Dec. 15, 1931.  G. M. McMURDO  1,836,610
AUTOMOBILE BUMPER
Filed Dec. 4, 1930  2 Sheets-Sheet 1
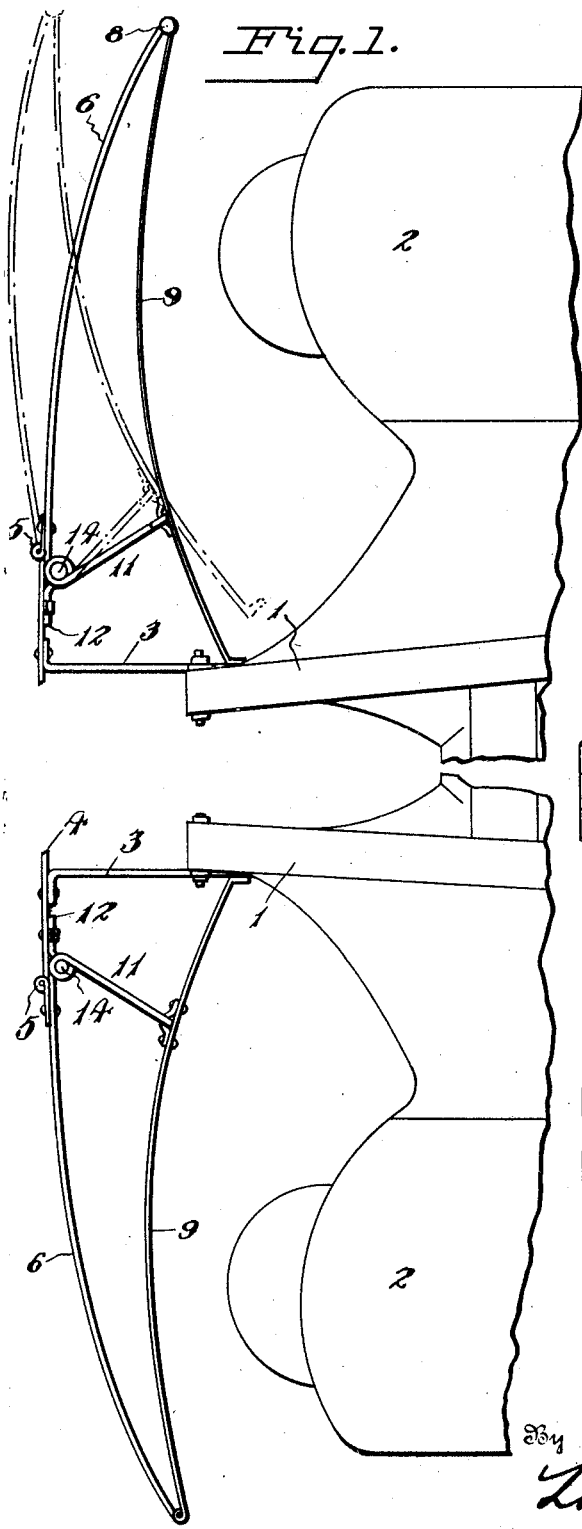
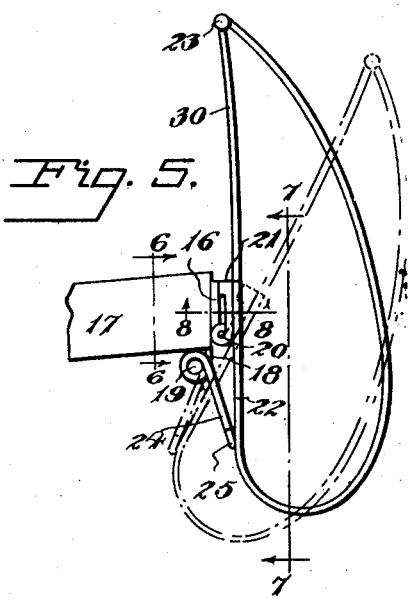
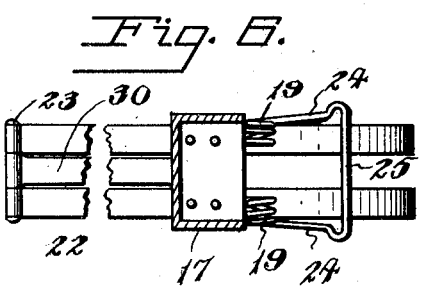
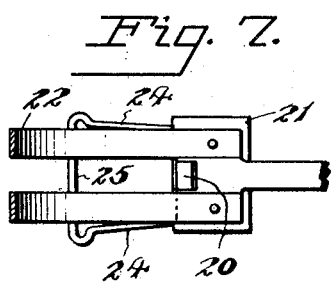
Inventor
G. M. McMurdo Dec. 15, 1931.  G. M. McMURDO  1,836,610
AUTOMOBILE BUMPER
Filed Dec. 4, 1930   2 Sheets-Sheet 2
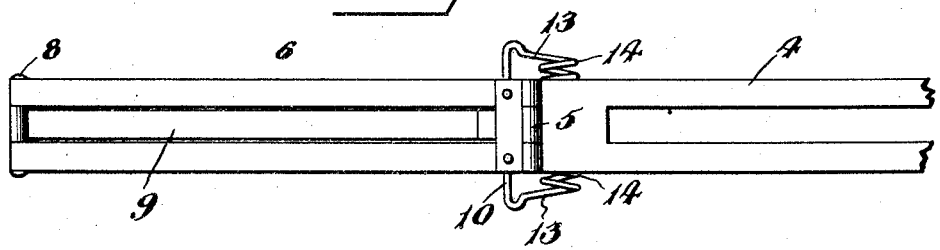
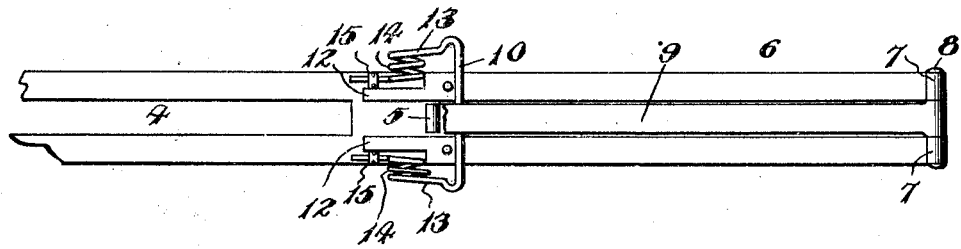
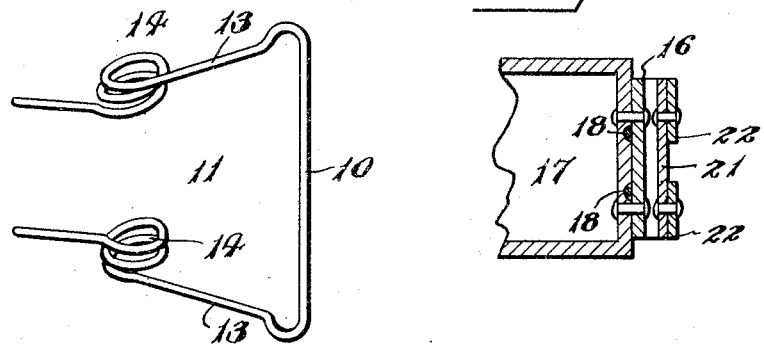
Inventor
G. M. McMurdo
By Lacey & Lacey, Attorneys Patented Dec. 15, 1931

1,836,610

UNITED STATES PATENT OFFICE

GEORGE M. McMURDO, OF McALESTER, OKLAHOMA

AUTOMOBILE BUMPER

Application filed December 4, 1930. Serial No. 500,086.

This invention has for its object the provision of a bumper for automobiles which will yield to the impact of a passing vehicle and will automatically return to normal position. The invention provides a bumper of such construction that interlocking or entanglement of the bumpers upon two vehicles will be avoided and damage to the vehicles due to such interlocking of bumpers will be prevented. The invention is illustrated in the accompanying drawings and consists in certain novel features which will be hereinafter first fully described and then more particularly defined in the appended claims.

In the drawings:

Figure 1 is a plan view of the front portion of a motor vehicle having the bumper of my invention applied thereto, the intermediate portion of the vehicle and the bumper being broken away.

Fig. 2 is a front elevation of one end portion of the bumper,

Fig. 3 is a rear elevation of the same,

Fig. 4 is an enlarged detail view of the spring which is employed,

Fig. 5 is a plan view of the bumper applied to the rear corner of the vehicle frame, Fig. 6 is a front elevation of the rear bumper, with parts in section on the line 6—6 of Fig. 5, Fig. 7 is a rear elevation, with parts in section on the line 7—7 of Fig. 5, and Fig. 8 is an enlarged detail section on the line 8—8 of Fig. 5.

Referring more particularly to the drawings, the numeral 1 indicates a portion of the front end part of the automobile frame and 2 indicates a portion of the fenders extending over the front wheels of the vehicle. To the frame at the sides of the same are secured bars 3 which project forwardly and have their front extremities turned laterally whereby they may be secured to a central bumper member 4 which may be of any approved design, and to the ends of which are secured hinge members 5, as clearly shown. Carried by the hinge members 5 are end bumper members 6 which are made to conform in their general design to the central bumper member 4 and at their outer ends are constructed with hinge eyes 7 receiving a pintle pin 8. Fitted around the pintle 8 between the eyes 7 is the outer end of a spring 9 which is a resilient plate of slightly arcuate normal form, the inner portion of each leaf spring or resilient plate 9 being engaged with the inner vertical end member 10 of a spring 11, and the inner extremity of the plate bearing against the bars 3 or the chassis to be braced thereby, as clearly shown in Fig. 1. The end bumper members 6 are each provided at their inner ends with stop lugs 12 which are adapted to impinge against the rear side of the central bumper member, as shown clearly in Fig. 3, and thereby limit the rearward movement of the end bumper members and hold them normally in such relation to the central member that they constitute elongations or extensions of the same curving slightly to the rear. The spring 11 has side members 13 converging from the central vertical member 10 and merging into coils 14 which are disposed at the rear of the bumper and at the top and bottom of the same, the extremities of the spring extending laterally from the coils and resting against the back of the central bumper member 4 to which they are secured by clips 15, as shown in Fig. 3.

It will now be understood that normally the bumper assumes the position shown in full lines in Fig. 1 so that it is adapted to receive the impact from a vehicle in front of the vehicle equipped with the bumpers and resist the relative movement of the two vehicles so that forcible collision between the bodies of the cars will be resisted. Should a vehicle be passing the vehicle equipped with my bumpers and swerve toward the latter vehicle or cut in ahead of it too soon, the projecting portions of the passing vehicle will engage the outer end of the adjacent bumper member 6 which will thereupon yield to the impact and swing forwardly so that the passing vehicle will clear the vehicle which is being passed. The coil 14 of the spring will be put under increased tension when the bumper member 6 is thus swung forward so that as soon as the bumper is cleared the reflex action of the spring will return the bumper member to its normal position.

In applying the invention to the rear end of a vehicle, a bracket 16 is secured to the rear end of the chassis sill 17 or some other fixed part of the frame and this bracket or block 16 passes across the ends 18 of a coiled spring 19 which ends are seated in grooves formed in the rear face of the frame member, as clearly shown in Fig. 8. Attached to the block or bracket 16 by a hinge 20 is a swinging block or bracket 21 to which the bumper member 22 is firmly secured. This bumper member 22 is of the same general design as the front bumper in order to maintain a uniformity of appearance in the vehicle and is shown as composed of two leaf springs having their outer free ends connected by a pin 23 and a bracing member 30 extending from the pin 23 to the block 21. The bumper member 22 extends inwardly from the block 21 for a short distance, as shown in Fig. 5, and then curves rearwardly and then outwardly to extend laterally beyond the vehicle at the rear of the rear wheel and the spring coils 19 are formed in side members 24 connected at their inner ends by a vertical member 25, thereby defining a spring the same in all respects as the spring 10 employed on the front bumper. The vertical portion 25 of the rear spring bears against the front face of the inwardly extending straight portion of the bumper member 22, as shown in Figs. 6 and 7, so that the bumper will be normally held in its rearward postion shown in full lines in Fig. 5. The resiliency of the bumper will permit it to yield to impact with a car at the rear of the car which is equipped with the bumper and will thereby prevent damaging collision. If a car should be backing alongside of the car equipped with my bumpers and should move too close to the equipped car, the projecting end portion of the bumper 22 would be engaged and the bumper would swing about its hinge mounting to the position indicated in dotted lines in Fig. 5 so that the interfering vehicle would be cleared, the springs 19 being put under increased tension so as to return the bumper to its normal position immediately after the car clears.

From the foregoing description, taken in connection with the accompanying drawings, will be seen that I have provided a very simple construction of bumper which may be installed at a low cost and which will prove highly efficient in use.

Having thus described the invention, I claim:

1. A bumper device for automobiles comprising a relatively rigid supporting member, a yieldable member hingedly mounted upon the supporting member, and a torsion spring mounted upon the supporting member adjacent the hinge mounting for the yieldable member and having side arms extending to and engaged with the yieldable member to hold the latter in normal position.

2. A bumper comprising a central member, means for rigidly securing said central member upon a vehicle, end members hinged to the ends of the central member, stops extending from the inner ends of the end members to bear against the rear side of the central member to limit the movement of the end members, leaf springs secured at their outer ends to the outer ends of the respective end members, and torsion springs mounted upon the central member and engaged with the inner ends of said leaf springs.

3. A bumper comprising a torsion spring, a bracket secured over the outer ends of said torsion spring to secure the same to the frame of a vehicle, a bumper member hinged to said bracket and extending laterally and then rearwardly and outwardly therefrom, the inner end of the torsion spring bearing against the inner end portion of said bumper member whereby to yieldably hold the same in its rear normal position.

4. A bumper comprising a resilient member having an inner straight end portion and extending rearwardly and then outwardly from said straight end portion, means for hingedly mounting the inner straight end portion of the bumper upon a vehicle frame, and yieldable means for holding the bumper in its rearward position.

In testimony whereof I affix my signature.

GEORGE M. McMURDO. [L. S.]